June 22, 1954     J. M. WOLF     2,681,986
TEST APPARATUS FOR PULSED TRANSMITTER-RECEIVER SYSTEMS
Filed Dec. 10, 1945
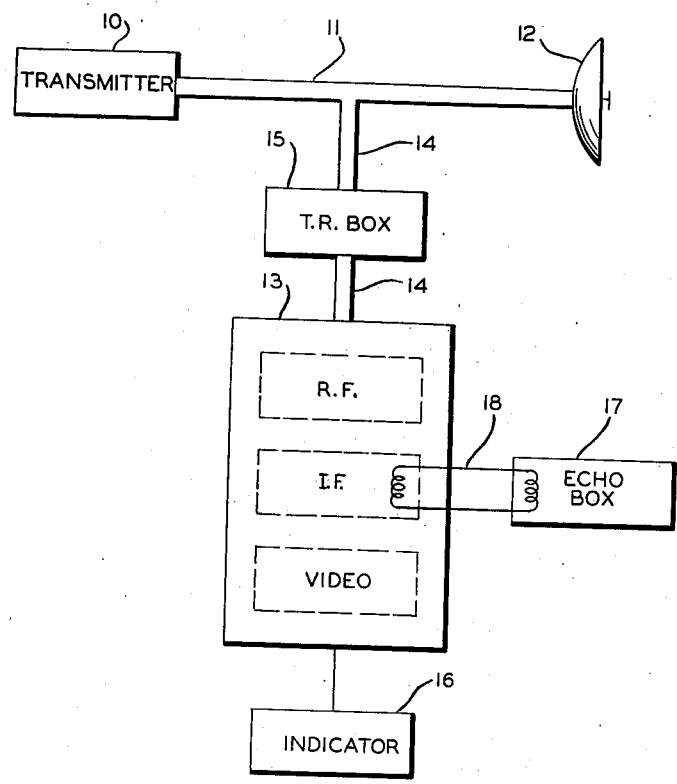
INVENTOR
JAMES M. WOLF
BY *M. O. Hayes*
ATTORNEY Patented June 22, 1954

2,681,986

UNITED STATES PATENT OFFICE 2,681,986

TEST APPARATUS FOR PULSED TRANSMITTER-RECEIVER SYSTEMS

James M. Wolf, Boston, Mass., assignor, by mesne assignments, to the United States of America as represented by the Secretary of the Navy Application December 10, 1945, Serial No. 634,116

1 Claim. (Cl. 250—13)

This invention relates to testing devices, and more particularly those for testing the operation and performance of a system for transmitting and receiving pulses of radio energy.

In the operation of such systems it is highly desirable to provide a device capable of furnishing a rapid check of the overall performance of the system. For instance, in pulse-echo systems the failure to locate objects may not be an indication of trouble but may result from the absence of such objects. Therefore, such a testing device is necessary to indicate a failure in the system, as contrasted to the lack of targets.

Certain types of cavity resonators, frequently termed echo boxes, have been adapted to provide an excellent check of overall system performance. Such a resonator is excited at the carrier frequency of the system by coupling into it a small portion of the transmitted power. The transmitted energy is stored and then reradiated at a sufficiently high power level and for a time sufficiently long to permit energy so given out to be picked up by the receiver of the system being tested. The period of time for which the energy given out by the resonator can be perceived by the indicating apparatus of the system under test bears a simple relationship to the overall effectiveness of that system. Various methods have been used to couple transmitted power into the resonator, among them being a dipole so placed as to intercept a portion of the power radiated by the system's antenna, and a directional coupler placed in the transmission line connecting the transmitter and the antenna.

The cavity resonator may be replaced by any device capable of storing radio energy and then returning this energy to the system. One device so used is an echo line connected to the main transmission line between the receiver and the antenna. By means of a directional coupler, a predetermined portion of the transmitted energy is coupled into the line. If the echo line is terminated in an impedance mismatch at each end, the energy which enters it travels back and forth, being successively reflected from the ends and attenuated exponentially by the losses in the line. Each time the energy makes a round trip and passes the directional coupler in the proper direction a small fraction of the energy is coupled through the wave selector into the receiver, appearing as a signal on the indicator. The number of echoes appearing on the indicator gives an indication of set efficiency.

In endeavoring to adapt such devices to systems operating at very high carrier frequencies various technical difficulties become pronounced. Heretofore, all effort, as far as I am aware, has been exerted in the direction of overcoming these difficulties by improving the design of such echo boxes so as to adapt them to successful operation at the higher frequencies. I have found that the problem can be solved by a wholly different approach, namely, by storing and reradiating the energy at the intermediate frequency of the system under test.

It is therefore, the object of the present invention to provide a testing device which can be adapted to use with systems operating at any frequency band and which will have the same properties on all bands.

This and other objects will be more apparent upon consideration of the following specifications, taken in connection with the accompanying drawing, the single figure being a block diagram of an embodiment of the invention.

The radio transmission and receiving system shown comprises a transmitter 10 for generating short-duration high-intensity pulses of high frequency radio energy, a transmission line 11, and an antenna 12 for radiating this energy and picking up any resulting echoes. A receiver 13 is connected to transmission line 11 by transmission line 14, with which is associated a protective electric breakdown device 15. Receiver 13 is broken down into three sections of differing frequency, namely the radio frequency input section, the intermediate frequency section, and the video output section. The output of receiver 13 is connected to indicator 16 which presents the echo indication on a cathode ray tube.

In accordance with the present invention, an echo box 17 is coupled into one of the I-F stages of receiver 13. Any convenient type of coupling could be employed, link coupling 18 being shown in the present case. When transmitter 10 fires, a portion of its output leaks through protective device 15 and into the receiver. This radio frequency energy is amplified and converted to the intermediate frequency. If echo box 17 is resonant at the intermediate frequency, it will store energy during the pulse transmission and reradiate this energy to the system at the conclusion of the pulse. The time during which energy is return to the system, commonly termed "ringing time," will be a function of the amount of energy stored during the pulse, the "Q" of the resonator, and the sensitivity of the receiver. The amount of energy stored during the pulse is a function of the transmitter output power and the gain of the receiver circuits up to the coupling link 18. In order to provide for an extended "ringing time," the echo box is so designed that the energy loss per cycle is small compared to the energy stored. The noise of the receiver circuits determines the minimum level of reradiated energy which can be measured as "ringing time."

The input to the receiver may, if preferable, be a deliberate quantitative coupling by means of directional couplers, a switch, and an attenuator. This would adapt the system to longer "ringing times" and higher sensitivity. An echo line, as previously described, may be used in place of the resonant echo box.

Since the intermediate frequencies of most systems lie within a relatively narrow band, the intermediate frequency echo box or echo line can be adapted to any band and will have the same properties on all bands. It can be pretuned to the intermediate frequency of the system, and need not be retuned while in use. This is a distinct advantage over operation at the carrier frequency of the system, since the carrier frequency may fluctuate, but automatic frequency control circuits will maintain the intermediate frequency constant.

It is believed that the construction and operation of my invention, as well as the advantages thereof, will be apparent from the foregoing description. It will be understood that while I have shown and described my invention in a particular embodiment, changes may be made in the circuits disclosed without departing from the invention.

What is claimed is:

In combination with a system for transmitting and receiving short pulses of radio energy, said system comprising a transmitter for generating short duration, high intensity pulses of high frequency radio energy, a first transmission line connected at one end to the output of said transmitter, an antenna connected at the other end of said transmission line for radiating the generated pulses and for picking up any resulting echoes, a second transmission line, a protective electric breakdown device connected in series with said second transmission line, a receiver, said receiver being connected to said first transmission line through said second transmission line in series with said electrical breakdown device, and an indicator, said indicator being connected to the output of said receiver, said receiver including intermediate frequency circuits, whereby, when said transmitter fires, a portion of its output passes through said protective device into said receiver, an echo box resonant at said intermediate frequency, coupling means between said intermediate frequency circuits and said echo box for coupling a portion of the energy at the intermediate frequency circuits to said echo box, said echo box storing said portion of energy, said coupling means being the means for transferring some of said stored energy within said echo box back to said intermediate frequency circuits of said receivers, the relative amount of said stored energy which is transferred back to said system being measured by said indicator.

References Cited in the file of this patent

UNITED STATES PATENTS

| Number | Name | Date |
| --- | --- | --- |
| 2,041,040 | Barden | May 19, 1936 |
| 2,174,963 | Braaten | Oct. 3, 1939 |
| 2,421,016 | Deloraine et al. | May 27, 1947 |
| 2,467,670 | Hershberger | Apr. 19, 1949 |
| 2,502,464 | Lehmann | Apr. 4, 1950 |
| 2,510,299 | Schramm | June 6, 1950 |
| 2,532,539 | Counter et al. | Dec. 5, 1950 |